US012355381B2

(12) United States Patent
Yamato et al.

(10) Patent No.: US 12,355,381 B2
(45) Date of Patent: Jul. 8, 2025

(54) CONTROL DEVICE, INVERTER SYSTEM, CONTROL METHOD, AND PROGRAM

(71) Applicant: MITSUBISHI HEAVY INDUSTRIES THERMAL SYSTEMS, LTD., Tokyo (JP)

(72) Inventors: Hiroaki Yamato, Tokyo (JP); Kyohei Watanabe, Tokyo (JP); Makoto Hattori, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 128 days.

(21) Appl. No.: 18/283,712

(22) PCT Filed: Feb. 8, 2022

(86) PCT No.: PCT/JP2022/004866
§ 371 (c)(1),
(2) Date: Sep. 22, 2023

(87) PCT Pub. No.: WO2022/209318
PCT Pub. Date: Oct. 6, 2022

(65) Prior Publication Data
US 2024/0178783 A1    May 30, 2024

(30) Foreign Application Priority Data
Apr. 2, 2021 (JP) .................................. 2021-063459

(51) Int. Cl.
*H02P 27/08* (2006.01)
*H02M 1/12* (2006.01)
(Continued)

(52) U.S. Cl.
CPC .............. *H02P 27/08* (2013.01); *H02M 1/12* (2013.01); *H02M 7/53873* (2013.01); *H02M 7/5395* (2013.01)

(58) Field of Classification Search
CPC ........ H02M 1/12; H02M 7/5395; H02P 27/08
See application file for complete search history.

(56) References Cited

U.S. PATENT DOCUMENTS 5,229,693 A * 7/1993 Futami ...................... H02P 6/06
                                                                 318/400.14
2015/0311819 A1   10/2015 Matsumoto

FOREIGN PATENT DOCUMENTS

JP          2014-124024 A        7/2014

OTHER PUBLICATIONS

International Search Report for International Application No. PCT/JP2022/004866, dated Apr. 5, 2022, with English translation.
(Continued)

*Primary Examiner* — Antony M Paul
(74) *Attorney, Agent, or Firm* — Birch, Stewart, Kolasch & Birch, LLP

(57) ABSTRACT

This control device controls an inverter for driving a load, the control device comprising: a first generation unit for generating a first signal for performing two-phase modulation if a three-phase alternating current voltage for driving the load is generated; an acquisition unit for acquiring the weight of the load; a storage unit for storing corresponding relationships between the weight of the load and a phase shift amount of the first signal; an identification unit for identifying the phase shift amount corresponding to the weight of the load acquired by the acquisition unit in the corresponding relationship; and a second generation unit for generating a second signal in which the phase shift amount (Continued)

has been altered from the first signal on the basis of the phase shift amount identified by the identification unit.

20 Claims, 7 Drawing Sheets

(51) Int. Cl.
    *H02M 7/5387*    (2007.01)
    *H02M 7/5395*    (2006.01)

(56)           References Cited

OTHER PUBLICATIONS

Written Opinion of the International Searching Authority for International Application No. PCT/JP2022/004866, dated Apr. 5, 2022, with English translation.

\* cited by examiner

CONTROL DEVICE, INVERTER SYSTEM, CONTROL METHOD, AND PROGRAM

TECHNICAL FIELD

The present disclosure relates to a control device, an inverter system, a control method, and a program.

This application claims the priority of Japanese Patent Application No. 2021-063459 filed in Japan on Apr. 2, 2021, the content of which is incorporated herein by reference.

BACKGROUND ART

Inverters that convert direct current power into alternating current power are used in various fields, including vehicles, such as automobiles, and home appliances.

As a related technique, PTL 1 discloses a technique relating to an inverter that adopts a two-phase modulation method. The two-phase modulation method is a control method as follows. Switching of a switching element corresponding to one phase of three phases is stopped in a certain period of time, and switching elements corresponding to the other two phases are switched to maintain each interphase voltage of a desired three-phase alternating current voltage. In a general two-phase modulation method, switching of the corresponding switching element is stopped for one phase in a vicinity of a peak of the desired three-phase alternating current voltage, and the switching elements corresponding to the other two phases are switched to maintain each interphase voltage of the desired three-phase alternating current voltage.

CITATION LIST

Patent Literature

[PTL 1] Japanese Unexamined Patent Application Publication No. 2014-124024

SUMMARY OF INVENTION

Technical Problem

Other devices may be connected to a power supply that supplies direct current power to an inverter. In addition, a current output from the power supply may have a ripple. In this case, when other devices have a frequency characteristic that resonates at a frequency of a current having the ripple output by the power supply, there is a possibility that a problem occurs in the other devices. Therefore, an LC filter including an inductor L and a capacitor C may be used as means for removing a ripple component thereof.

Incidentally, in an inverter that generates three-phase alternating current power from the direct current power, the above-described two-phase modulation method may be used to reduce a loss caused by the switching. An LC filter may also be used when the two-phase modulation method is used. The inverter includes a switching element, and converts the direct current power into the alternating current power by switching the switching element between an ON state and an OFF state. Therefore, when a frequency of a harmonic wave generated by the switching of the inverter is close to a resonance frequency of the LC filter, there is a possibility that an amplitude of the harmonic wave is amplified. In this case, a value of at least one of inductance of the inductor L and capacitance of the capacitor C is increased, and the resonance frequency of the LC filter is lowered. In this manner, the frequency of the harmonic wave generated by the switching of the inverter and the resonance frequency of the LC filter can be kept away from each other, and it is possible to reduce the amplitude of the harmonic wave generated by the switching of the inverter. However, in general, it is necessary to increase a size of the inductor L to increase the inductance. In addition, in general, it is necessary to increase a size of the capacitor C to increase the capacitance. This fact is contrary to a demand for downsizing in various fields, including vehicles, such as automobiles, and home appliances.

Therefore, when electric power is supplied from the power supply to the inverter using the two-phase modulation method, it is desirable to provide a technique which can reduce the amplitude of harmonic wave generated by the switching of the inverter without changing a size of the filter.

The present disclosure is made to solve the above-described problems, and an object of the present disclosure is to provide a control device, an inverter system, a control method, and a program which can reduce an amplitude of a harmonic wave generated by switching of an inverter without changing a size of a filter when electric power is supplied from a power supply to the inverter using a two-phase modulation method.

Solution to Problem

According to the present disclosure, in order to solve the above-described problems, there is provided a control device that controls an inverter for driving a load. The control device includes a first generation unit that generates a first signal for performing two-phase modulation when a three-phase alternating current voltage for driving the load is generated, an acquisition unit that acquires a weight of the load, a storage unit that stores a corresponding relationship between the weight of the load and a phase shift amount of the first signal, an identification unit that identifies the phase shift amount corresponding to the weight of the load acquired by the acquisition unit, in the corresponding relationship, and a second generation unit that generates a second signal in which the phase shift amount is changed from the first signal, based on the phase shift amount identified by the identification unit.

According to the present disclosure, there is provided an inverter system including a low-pass filter, an inverter that converts direct current power into alternating current power, a power supply that supplies the direct current power to the inverter via the low-pass filter, and the control device that controls the inverter.

According to the present disclosure, there is provided a control method performed by a control device that controls an inverter for driving a load. The control method includes generating a first signal for performing two-phase modulation when a three-phase alternating current voltage for driving the load is generated, acquiring a weight of the load, storing a corresponding relationship between the weight of the load and a phase shift amount of the first signal, identifying the phase shift amount corresponding to the acquired weight of the load in the corresponding relationship, and generating a second signal in which the phase shift amount is changed from the first signal, based on the identified phase shift amount.

According to the present disclosure, there is provided a program causing a computer that controls an inverter for driving a load to execute a process including generating a first signal for performing two-phase modulation when a three-phase alternating current voltage for driving the load is generated, acquiring a weight of the load, storing a corresponding relationship between the weight of the load and a phase shift amount of the first signal, identifying the phase shift amount corresponding to the acquired weight of the load in the corresponding relationship, and generating a second signal in which the phase shift amount is changed from the first signal, based on the identified phase shift amount.

Advantageous Effects of Invention

According to the control device, the inverter system, the control method, and the program in the present disclosure, it is possible to reduce the amplitude of the harmonic wave generated by switching of the inverter without changing a size of the filter when electric power is supplied from the power supply to the inverter using the two-phase modulation method.

DESCRIPTION OF EMBODIMENTS

Embodiments

Hereinafter, embodiments will be described in detail with reference to the drawings.
(Configuration of Motor Drive Device)

Figure 1:
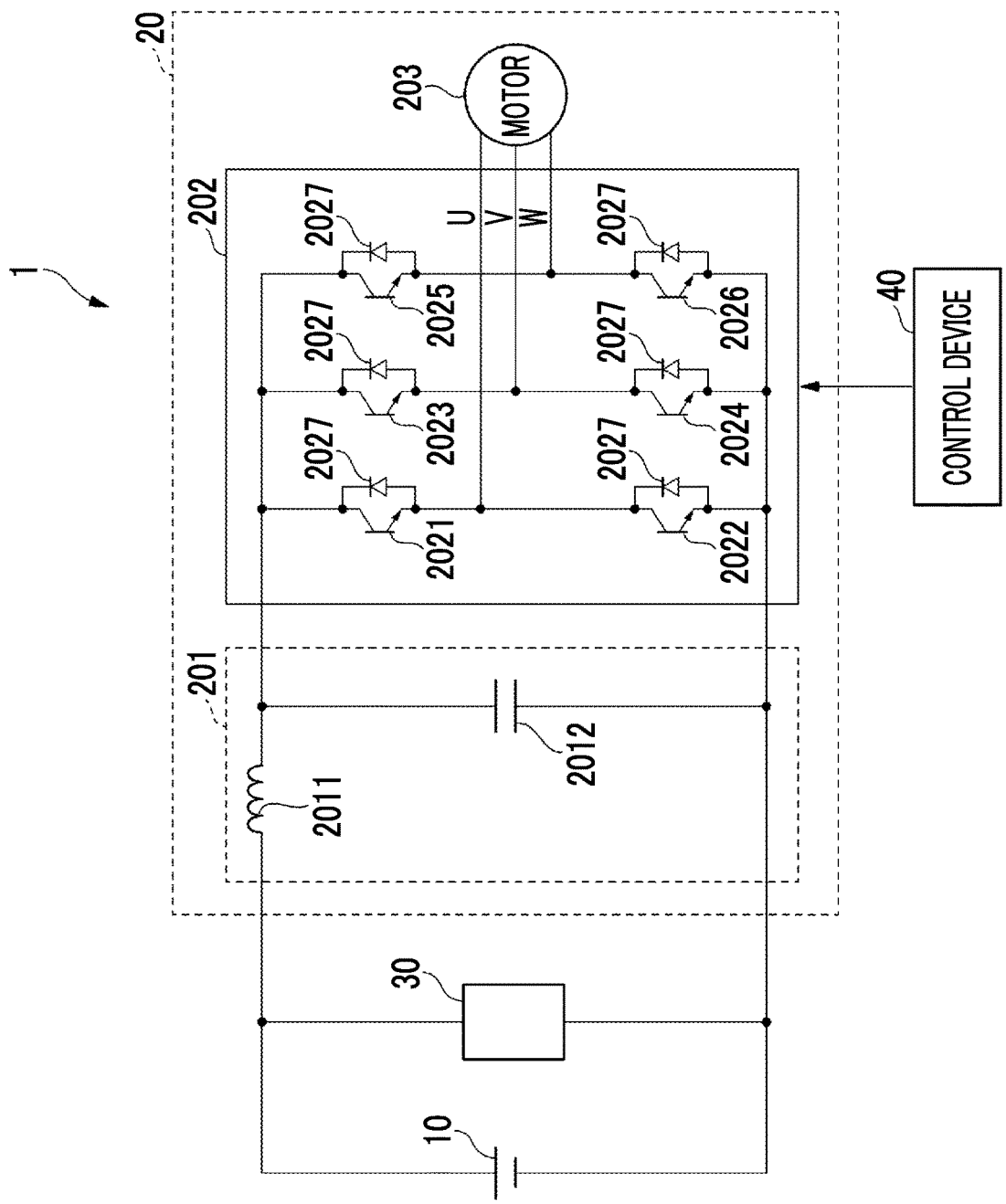
FIG. 1 is a view illustrating an example of a configuration of a motor drive device according to one embodiment of the present disclosure.

A motor drive device according to an embodiment of the present disclosure will be described. FIG. 1 is a view illustrating a configuration of a motor drive device 1 (an example of an inverter system) according to the embodiment of the present disclosure. The motor drive device 1 is a device which can reduce an amplitude of a harmonic wave generated by switching of an inverter without changing a size of a low-pass filter when electric power is supplied from a power supply to the inverter using a two-phase modulation method.

As illustrated in FIG. 1, the motor drive device 1 includes a power supply 10, a first device 20, a second device 30, and a control device 40. The power supply 10 supplies direct current power to the first device 20 and the second device 30.

The first device 20 includes a low-pass filter 201, an inverter 202, and a load 203. The low-pass filter 201 removes a ripple of a current flowing from the inverter 202 to the power supply 10. For example, the low-pass filter 201 includes an inductor 2011 and a capacitor 2012. In this case, the low-pass filter 201 is an LC filter. For example, the first device 20 is a compressor.

The inverter 202 generates a three-phase alternating current voltage that drives the load 203 under control of the control device 40. As illustrated in FIG. 1, the inverter 202 includes switching elements 2021, 2022, 2023, 2024, 2025, and 2026. The switching elements 2021, 2022, 2023, 2024, 2025, and 2026 form a bridge circuit. The switching element 2021 is an element forming an upper arm corresponding to a U-phase of the three-phase alternating current voltage that drives the load 203. The switching element 2022 is an element forming a lower arm corresponding to the U-phase of the three-phase alternating current voltage. The switching element 2023 is an element forming an upper arm corresponding to a V-phase of the three-phase alternating current voltage. The switching element 2024 is an element forming a lower arm corresponding to the V-phase of the three-phase alternating current voltage. The switching element 2025 is an element forming an upper arm corresponding to a W-phase of the three-phase alternating current voltage. The switching element 2026 is an element forming a lower arm corresponding to the W-phase of the three-phase alternating current voltage.

Examples of the switching elements 2021, 2022, 2023, 2024, 2025, and 2026 include an Insulated Gate Bipolar Transistor (IGBT) and a Field Effect Transistor (FET). In addition, as illustrated in FIG. 1, a diode 2027 having an upper side as a cathode and a lower side as an anode is connected in parallel to each of the switching elements 2021, 2022, 2023, 2024, 2025, and 2026. For example, the load 203 is a compressor motor (an example of a motor).

The second device 30 is a device different from the first device 20. For example, the second device 30 is a vehicle driving inverter.

Figure 2:
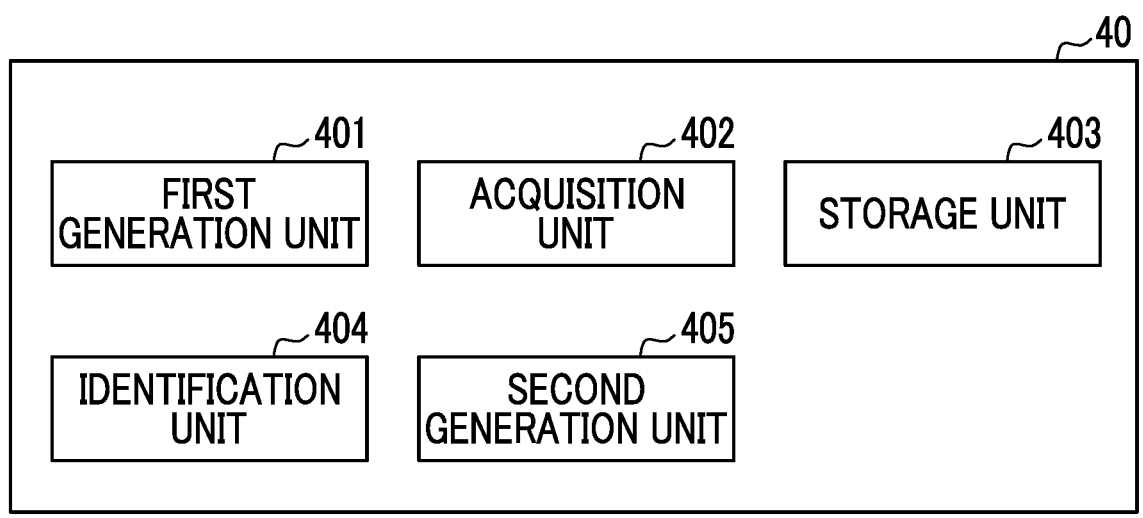
FIG. 2 is a view illustrating an example of a configuration of a control device according to the embodiment of the present disclosure.

The control device 40 is a device that controls the inverter 202. As illustrated in FIG. 2, the control device 40 includes a first generation unit 401, an acquisition unit 402, a storage unit 403, an identification unit 404, and a second generation unit 405.

Figure 3:
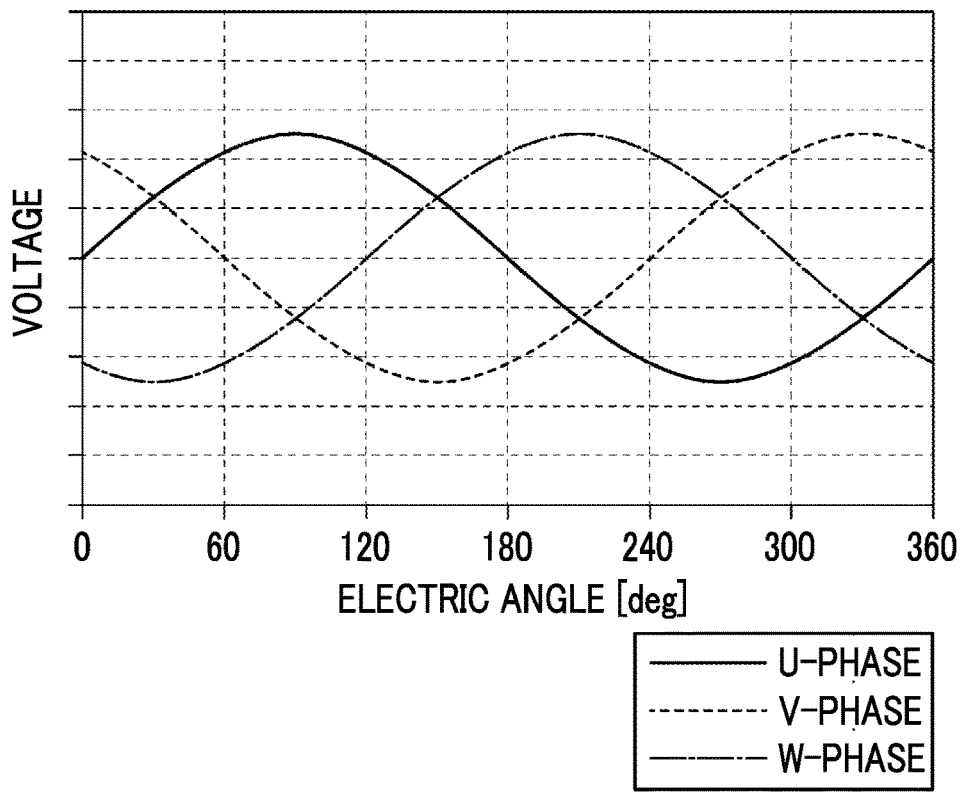
FIG. 3 is a view illustrating an example of a desired three-phase alternating current voltage in the embodiment of the present disclosure.

The first generation unit 401 generates a first signal sig1 for performing two-phase modulation when a three-phase alternating current voltage for driving the load 203 is generated. When the inverter 202 is controlled by a two-phase modulation method, the first signal sig1 is a signal for stopping switching of a corresponding switching element of one phase in a vicinity of a peak of a voltage or a current of each of three phases (for example, every time an electric angle is changed by 60 degrees), and is a signal for switching the other switching elements of two phases so that each interphase voltage of a desired three-phase alternating current voltage is maintained. FIG. 3 is a view illustrating an example of the desired three-phase alternating current voltage in the embodiment of the present disclosure. In FIG. 3, when it is assumed that 360 degrees is a return to 0 degrees, in the desired three-phase alternating current voltage, the W-phase has a downward convex peak at an electric angle of 0 to 60 degrees, the U-phase has an upward convex peak at 60 to 120 degrees, the V-phase has a downward convex peak at 120 to 180 degrees, the W-phase has an upward convex peak at 180 to 240 degrees, the U-phase has a downward convex peak at 240 to 300 degrees, and the V-phase has an upward convex peak at 300 to 360 (that is, 0) degrees.

Figure 4:
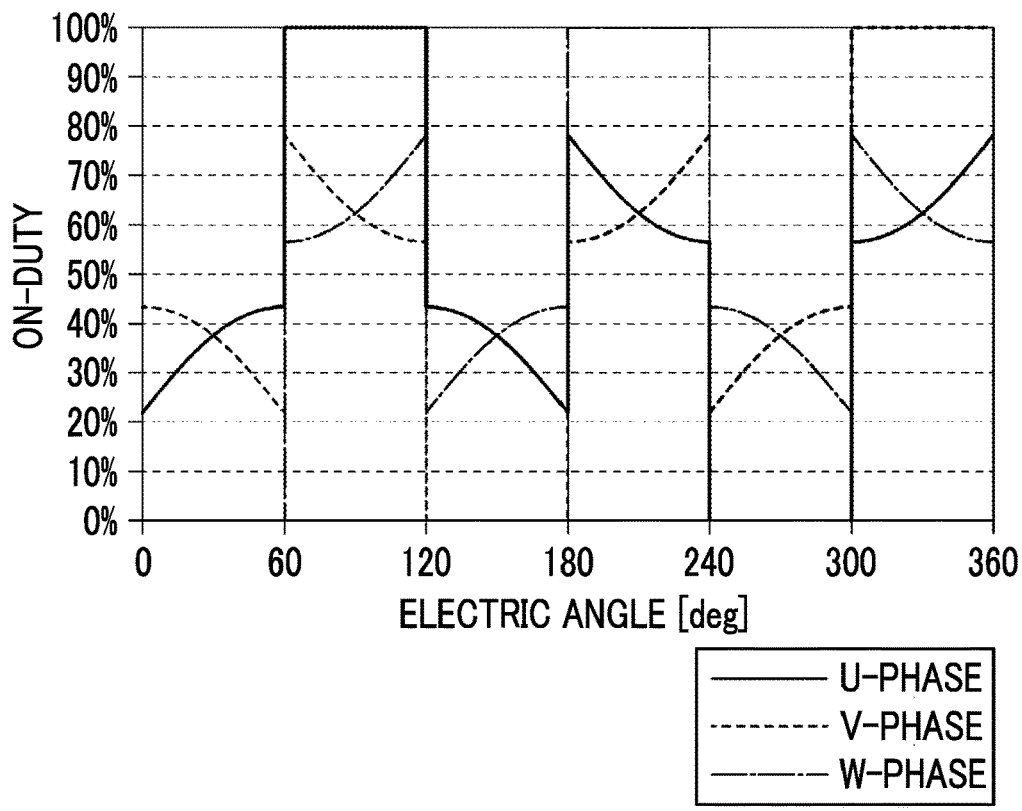
FIG. 4 is a view for describing a first signal according to the embodiment of the present disclosure.

FIG. 4 is a view for describing the first signal sig1 in the embodiment of the present disclosure. When it is assumed that the three-phase alternating current voltage illustrated in FIG. 3 is the desired three-phase alternating current voltage, and it is assumed that 360 degrees is a return to 0 degrees in FIG. 4, the first signal sig1 becomes a signal which is the same as a control signal for realizing on-duty illustrated in FIG. 4. That is, the first signal sig1 is the same signal as the control signal in which the on-duty of the W-phase is set to 0% at the electric angle of 0 to 60 degrees, the on-duty of the U-phase is set to 100% at 60 to 120 degrees, the on-duty of the V-phase is set to 0% at 120 to 180 degrees, the on-duty of the W-phase is set to 100% at 180 to 240 degrees, the on-duty of the U-phase is set to 0% at 240 to 300 degrees, and the on-duty of the V-phase is set to 100% at 300 to 360 (that is, 0) degrees. In addition, the first signal sig1 is the same signal as the control signal in which the same interphase voltage as the interphase voltage in the desired three-phase alternating current voltage can always be obtained.

The acquisition unit 402 acquires a weight of the load 203. For example, when the load 203 is the compressor motor, the acquisition unit 402 acquires a rotation speed of the compressor motor.

Figure 5:
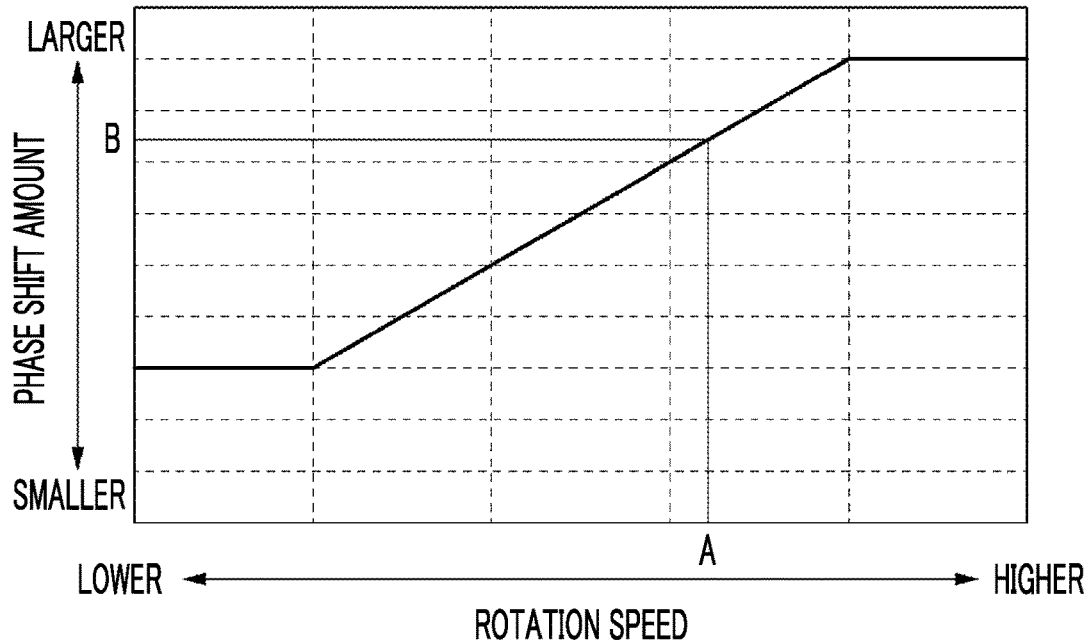
FIG. 5 is a view illustrating an example of a corresponding relationship between a weight of a load and a phase shift amount of a first signal in the embodiment of the present disclosure.
Figure 6:
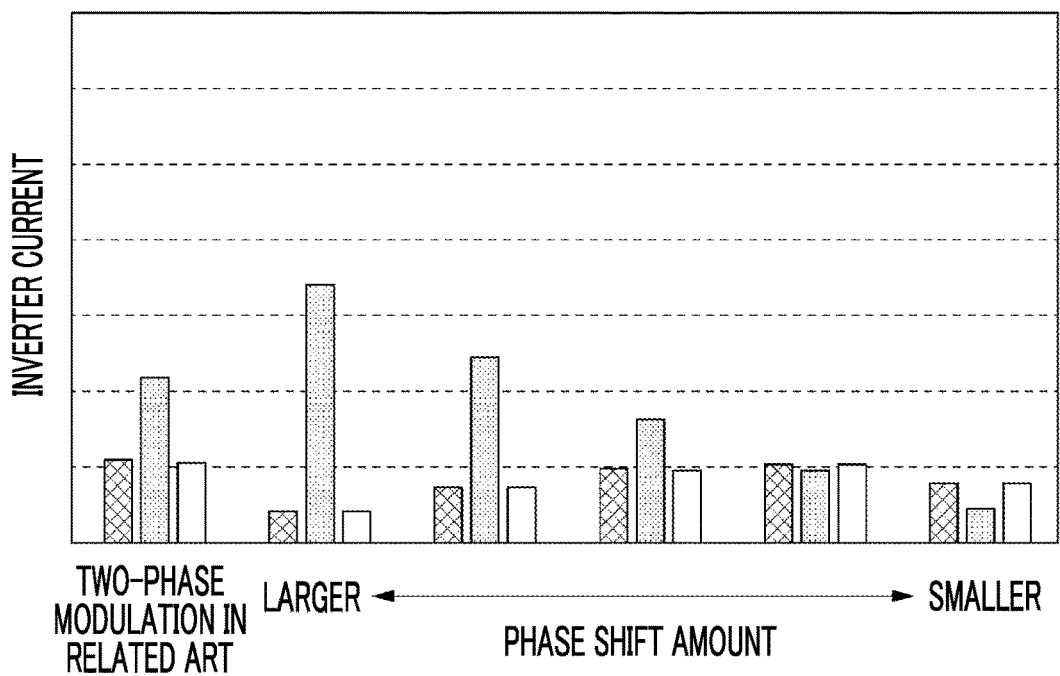
FIG. 6 is a first view illustrating an example of an experimental result in the embodiment of the present disclosure.
Figure 7:
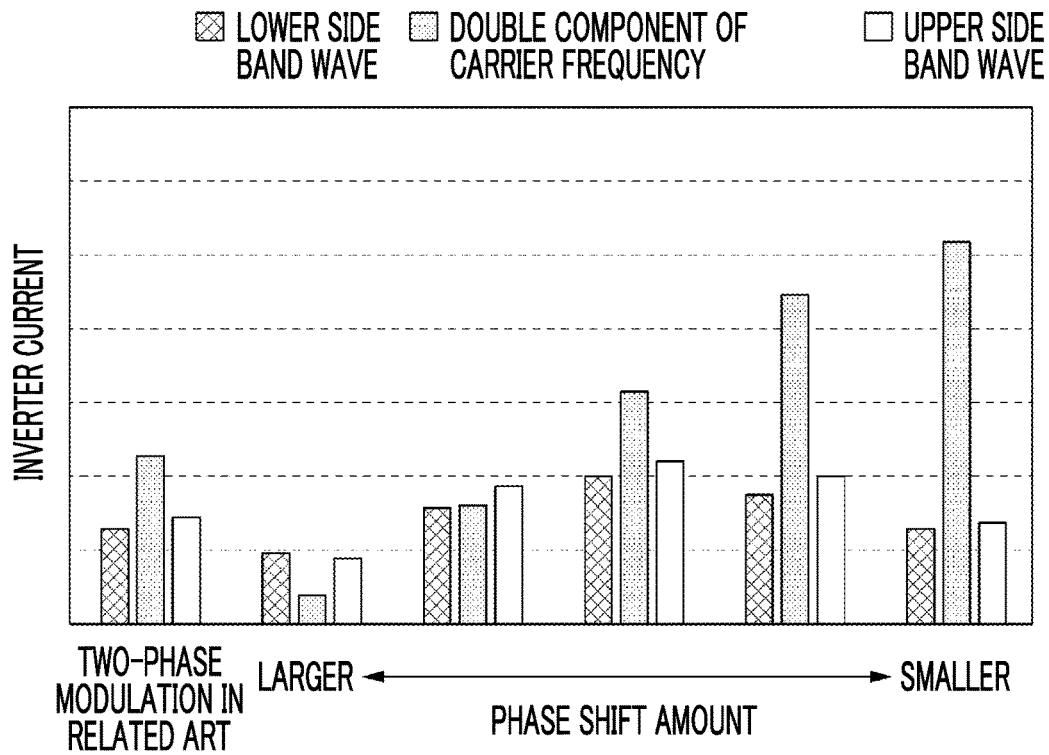
FIG. 7 is a second view illustrating an example of an experimental result in the embodiment of the present disclosure.

The storage unit 403 stores a corresponding relationship between the weight of the load 203 and a phase shift amount of the first signal. FIG. 5 is a view illustrating an example of the corresponding relationship between the weight of the load and the phase shift amount of the first signal in the embodiment of the present disclosure. FIG. 5 illustrates the corresponding relationship between the weight of the load 203 and the phase shift amount of the first signal when the load 203 is the compressor motor and the weight of the load 203 is a rotation speed. In a general two-phase modulation method, the switching of the corresponding switching element is stopped for one phase in the vicinity of the peak of the desired three-phase alternating current voltage, and the other switching elements of two phases are switched so that each interphase voltage of the desired three-phase alternating current voltage is maintained. However, the followings has been found through an experiment. An inverter current flowing from the inverter 202 to the power supply 10 or to the second device 30 is reduced by changing a timing at which the switching of the switching element is stopped. As a result, an amplitude of a harmonic wave of the current is also reduced. FIG. 6 is a first view illustrating an example of an experimental result in the embodiment of the present disclosure. FIG. 7 is a second view illustrating an example of an experimental result in the embodiment of the present disclosure. FIG. 6 illustrates a magnitude of the inverter current when the load 203 is relatively light (when the rotation speed of the compressor motor is low). In addition, FIG. 7 illustrates a magnitude of the inverter current when the load 203 is relatively heavy (when the rotation speed of the compressor motor is high). In FIGS. 6 and 7, a vertical axis represents the magnitude of the inverter current. In addition, a horizontal axis represents the phase shift amount of the first signal. From FIG. 6, it can be understood that when the load 203 is relatively light, the inverter current decreases when the phase shift amount of the first signal is smaller (for example, approximately 30 degrees). In addition, from FIG. 7, it can be understood that when the load 203 is relatively heavy, the inverter current decreases when the phase shift amount of the first signal is larger (for example, approximately 90 degrees). That is, FIG. 5 illustrates a correlation between the weight of the load 203 obtained through the experiment and the phase shift amount of the first signal in which the inverter current is reduced. As illustrated in FIG. 5, in a region where the load 203 is relatively light to a region where the load 203 is heavy, the phase shift amount of the first signal in which the inverter current is reduced is substantially proportional to the weight of the load 203.

The identification unit 404 identifies the phase shift amount of the first signal corresponding to the weight of the load 203 acquired by the acquisition unit 402 in the corresponding relationship stored by the storage unit 403. For example, when the weight of the load 203 acquired by the acquisition unit 402 is a rotation speed A, the identification unit 404 identifies the phase shift amount B corresponding to the rotation speed A in the corresponding relationship illustrated in FIG. 5.

Figure 8:
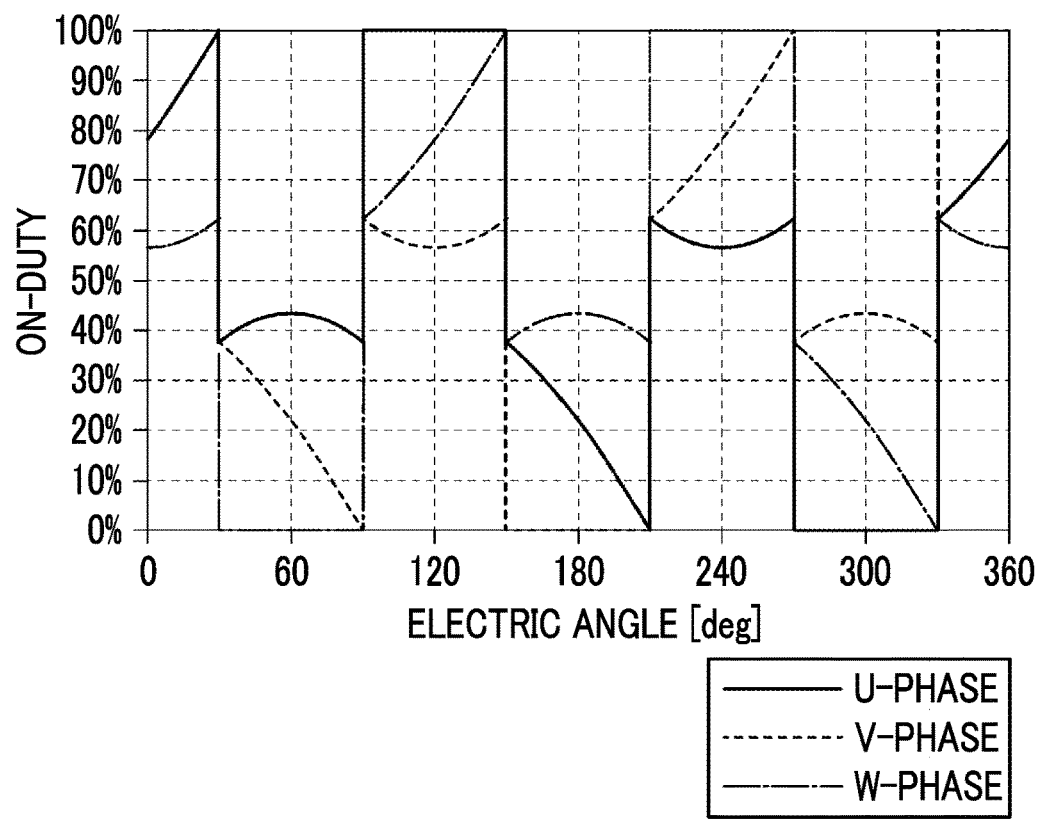
FIG. 8 is a view for describing a second signal according to the embodiment of the present disclosure.

The second generation unit 405 generates a second signal sig2 in which the phase shift amount is changed from the first signal sig1, based on the phase shift amount identified by the identification unit 404. For example, when the first signal sig1 is a signal for realizing the desired three-phase alternating current voltage with the on-duty illustrated in FIG. 4. When a phase shift amount B identified by the identification unit 404 is 90 degrees, the second generation unit 405 generates a control signal for realizing the desired three-phase alternating current voltage from a waveform illustrated in FIG. 8 in which a phase of the waveform illustrated in FIG. 4 is shifted by 90 degrees. In this case, when it is assumed that 360 degrees return to 0 degrees in FIG. 8, the second signal sig2 is a control signal in which the on-duty of the W-phase is set to 0% at an electric angle of 30 to 90 degrees, the on-duty of the U-phase is set to 100% at 90 to 150 degrees, the on-duty of the V-phase is set to 0% at 150 to 210 degrees, the on-duty of the W-phase is set to 100% at 210 to 270 degrees, the on-duty of the U-phase is set to 0% at 270 to 330 degrees, and the on-duty of the V-phase is set to 100% at 330 to 30 degrees. In addition, the second signal sig2 is a control signal in which the interphase voltage the same as the interphase voltage in the desired three-phase alternating current voltage can always be obtained.

Figure 9:
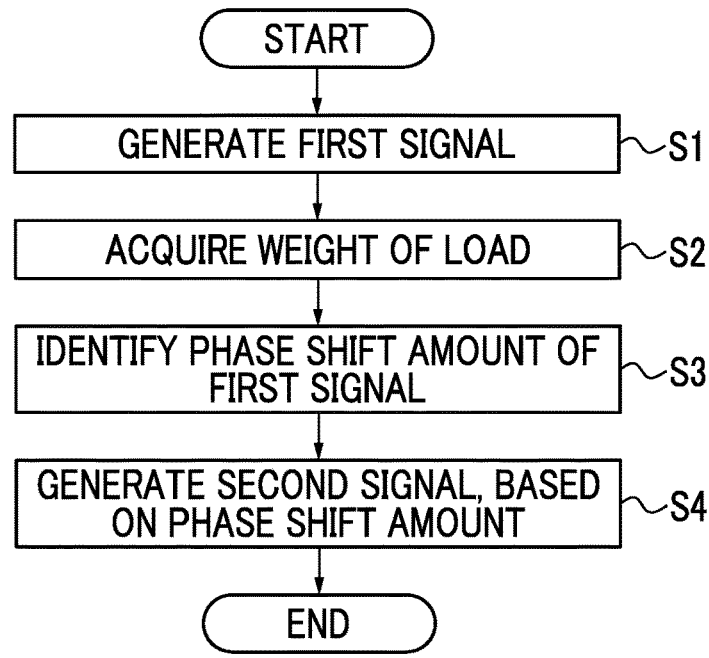
FIG. 9 is a view illustrating an example of a process flow of a control device 40 according to the embodiment of the present disclosure.

The motor drive device 1 according to the embodiment of the present disclosure will be described. FIG. 9 is a view illustrating an example of a process flow of an inverter control device according to the embodiment of the present disclosure. Here, a process of the control device 40 will be described with reference to FIG. 9. It is assumed that the storage unit 403 stores s the corresponding relationship (for example, the corresponding relationship illustrated in FIG. 5) between the weight of the load 203 and the phase shift amount of the first signal.

The first generation unit 401 generates the first signal sig1 for performing the two-phase modulation when the three-phase alternating current voltage for driving the load 203 is generated (Step S1). The acquisition unit 402 acquires the weight of the load 203 (Step S2). For example, when the load 203 is the compressor motor, the acquisition unit 402 acquires a rotation speed of the compressor motor.

The identification unit 404 identifies the phase shift amount of the first signal corresponding to the weight of the load 203 acquired by the acquisition unit 402 in the corresponding relationship stored by the storage unit 403 (Step S3). For example, when the weight of the load 203 acquired by the acquisition unit 402 is a rotation speed A, the identification unit 404 identifies the phase shift amount B corresponding to the rotation speed A in the corresponding relationship illustrated in FIG. 5.

The second generation unit 405 generates the second signal sig2 in which the phase shift amount is changed from the first signal sig1, based on the phase shift amount identified by the identification unit 404 (Step S4). For example, when the first signal sig1 is a signal for realizing the desired three-phase alternating current voltage with the on-duty illustrated in FIG. 4. When a phase shift amount B identified by the identification unit 404 is 90 degrees, the second generation unit 405 generates a control signal for realizing the desired three-phase alternating current voltage from a waveform illustrated in FIG. 8 in which a phase of the waveform illustrated in FIG. 4 is shifted by 90 degrees.

Hitherto, the motor drive device 1 according to the embodiment of the present disclosure has been described.

In the control device 40 of the motor drive device 1 according to the embodiment of the present disclosure, the first generation unit 401 generates the first signal sig1 for performing the two-phase modulation when the three-phase alternating current voltage for driving the load 203 is generated. The acquisition unit 402 acquires a weight of the load 203. The identification unit 404 identifies the phase shift amount of the first signal corresponding to the weight of the load 203 acquired by the acquisition unit 402 in the corresponding relationship stored by the storage unit 403. The second generation unit 405 generates a second signal sig2 in which the phase shift amount is changed from the first signal sig1, based on the phase shift amount identified by the identification unit 404.

In this manner, when electric power is supplied from the power supply 10 to the inverter 202 using the two-phase modulation method, the control device 40 can reduce the amplitude of the harmonic wave generated by the switching of the inverter 202 without changing a size of the low-pass filter 201.

Figure 10:
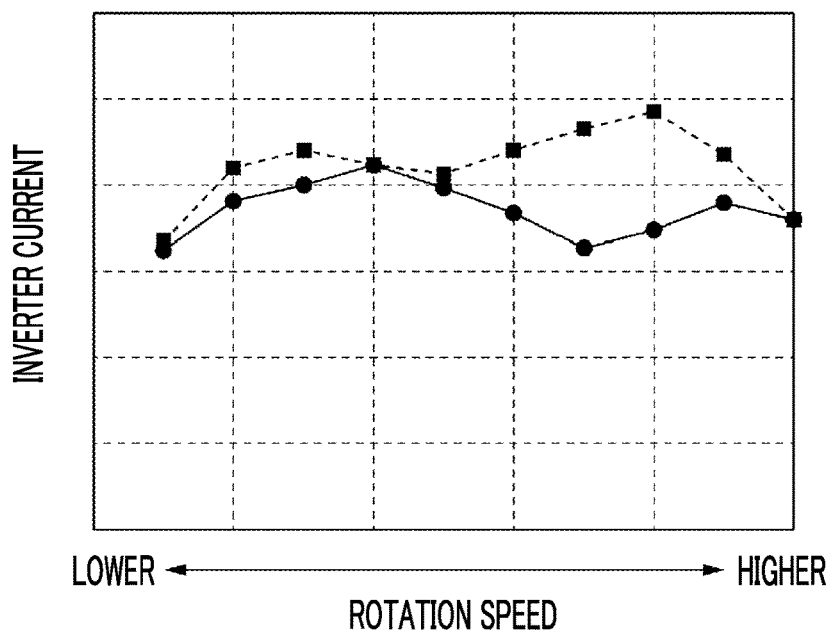
FIG. 10 is a view illustrating an example of a comparison result between an inverter current in the motor drive device according to the embodiment of the present disclosure and an inverter current in a motor drive device in the related art.

FIG. 10 is a view illustrating an example of a comparison result between an inverter current in the motor drive device 1 device according to the embodiment of the present disclosure and an inverter current in a motor drive device in the related art. As illustrated in FIG. 10, the motor drive device 1 according to the embodiment of the present disclosure can reduce the inverter current regardless of the size of the load 203, compared to the motor drive device in the related art.

The storage unit 403 in each embodiment of the present disclosure, other storage devices (including registers and latches), and other storage units may be provided anywhere within a range in which appropriate information is transmitted and received. In addition, a plurality of the storage units 403, other storage devices (including registers and latches), and other storage units may be present within the range in which appropriate information is transmitted and received, and data may be distributed and stored.

In a process according to the embodiment of the present disclosure, sequences of the process may be substituted within a range in which a proper process is performed.

Although the embodiment of the present disclosure has been described, the above-described control device 40 and other control devices may internally have a computer system. A procedure of the above-described processes is stored in a computer-readable recording medium in a form of a program, and the above-described processes are performed by a computer reading and executing the program. A specific example of the computer will be described below.

Figure 11:
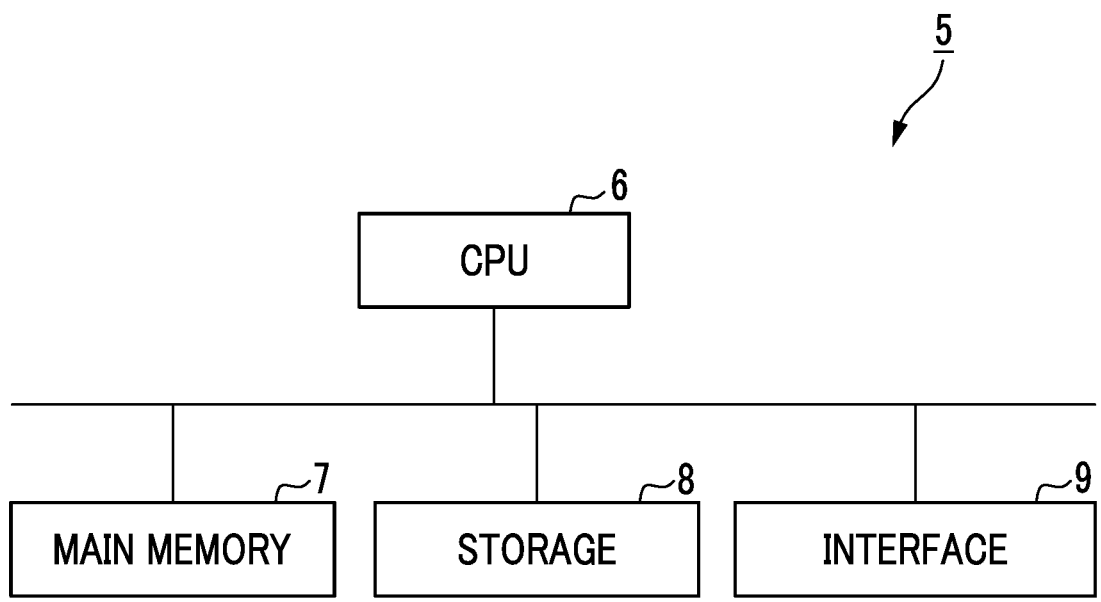
FIG. 11 is a schematic block diagram illustrating a configuration of a computer according to at least one embodiment.

FIG. 11 is a schematic block diagram illustrating a configuration of the computer according to at least one embodiment. As illustrated in FIG. 11, a computer 5 includes a CPU 6, a main memory 7, a storage 8, and an interface 9.

For example, each of the above-described control device 40 and other control devices are implemented on the computer 5. An operation of each processing unit described above is stored in the storage 8 in a form of a program. The CPU 6 reads the program from the storage 8, deploys the read program in the main memory 7, and executes the above-described process in accordance with the program. In addition, the CPU 6 secures a storage area corresponding to each of the above-described storage units in the main memory 7 in accordance with the program.

Examples of the storage 8 include a hard disk drive (HDD), a solid state drive (SSD), a magnetic disk, an optical magnetic disk, a compact disc read only memory (CD-ROM), a digital versatile disc read only memory (DVD-ROM), and a semiconductor memory. The storage 8 may be an internal medium directly connected to a bus in the computer 5, or may be an external medium connected to the computer 5 via the interface 9 or via a communication line. In addition, when this program is delivered to the computer 5 via the communication line, the computer 5 receiving the delivered program may deploy the program in the main memory 7 to execute the above-described process. In at least one embodiment, the storage 8 is a non-temporary tangible storage medium.

In addition, the above-described program may realize a part of the above-described functions. In addition, the above-described program may be a file, a so-called difference file (difference program), which can realize the above-described functions in combination with a program previously recorded in the computer system.

Although some embodiments of the present disclosure have been described, these embodiments are examples, and do not limit the scope of the invention. These embodiments may be subject to various additions, various omissions, various replacements, and various modifications within the scope not departing from the concept of the invention.

<Additional Notes>

The control device (40), the inverter system (1), the control method, and the program which are described in each embodiment of the present disclosure are recognized as follows, for example.

(1) According to a first aspect, there is provided the control device (40) that controls the inverter (202) for driving the load (203). The control device (40) includes the first generation unit (401) that generates the first signal for performing the two-phase modulation when the three-phase alternating current voltage for driving the load (203) is generated, the acquisition unit (402) that acquires the weight of the load (203), the storage unit (403) that stores the corresponding relationship between the weight of the load (203) and the phase shift amount of the first signal, the identification unit (404) that identifies the phase shift amount corresponding to the weight of the load (203) acquired by the acquisition unit (402), in the corresponding relationship, and the second generation unit (405) that generates the second signal in which the phase shift amount is changed from the first signal, based on the phase shift amount identified by the identification unit (404).

When electric power is supplied from the power supply (10) to the inverter (202) using the two-phase modulation method, the control device (40) can reduce the amplitude of the harmonic wave generated by switching of the inverter (202) without changing the size of the filter (201).

(2) According to a second aspect of the control device (40), in the control device (40) of (1), the load (203) may be the motor, and the weight of the load (203) may be the rotation speed of the motor.

When electric power is supplied from the power supply (10) to the inverter (202) using the two-phase modulation method, the control device (40) can reduce the amplitude of the harmonic wave generated by switching of the inverter (202) without changing the size of the filter (201).

(3) According to a third aspect of the control device (40), in the control device (40) of (1) or (2), the load (203) may be the motor, and the corresponding relationship may indicate that the rotation speed of the motor and the phase shift amount are proportional to each other.

The control device (40) can easily identify the rotation speed of the motor corresponding to the weight of the load (203).

(4) According to a fourth aspect of the control device (40), in the control device (40) according to any one of (1) to (3), the load (203) may be the motor, and the corresponding relationship may indicate that the phase shift amount is 90 degrees when the rotation speed is high in an entire range in the rotation speed of the motor.

The control device (40) can identify a proper phase shift amount when the load (203) is heavy.

(5) According to a fifth aspect of the control device (40), in the control device (40) according to any one of (1) to (4), the load (203) may be motor, and the corresponding relationship may indicate that the phase shift amount is 30 degrees when the rotation speed is low in an entire range in the rotation speed of the motor.

The control device (40) can identify a proper phase shift amount when the load (203) is light.

(6) According to a sixth aspect of the control device (40), in the control device (40) according to any one of (1) to (5), the phase shift amount may be an amount converted by the electric angle.

The control device (40) can identify a proper phase shift amount in view of the electric angle.

(7) According to a seventh aspect, there is provided the inverter system (1) including the low-pass filter (201), the inverter (202) that converts direct current power into alternating current power, the power supply (10) that supplies the direct current power to the inverter (202) via the low-pass filter (201), and the control device that controls the inverter (202) according to any one of the first to sixth aspects.

When the electric power is supplied from the power supply (10) to the inverter (202) using the two-phase modulation method, the inverter system can reduce the amplitude of the harmonic wave generated by the switching of the inverter (202) without changing the size of the filter (201).

(8) According to an eighth aspect, there is provided the control method performed by the control device (40) that controls the inverter (202) for driving the load (203). The control method includes generating the first signal for performing the two-phase modulation when the three-phase alternating current voltage is generated, acquiring the weight of the load (203), storing the corresponding relationship between the weight of the load (203) and the phase shift amount of the signal, identifying the phase shift amount corresponding to the acquired weight of the load (203) in the corresponding relationship, and generating the second signal in which the phase shift amount is changed from the first signal, based on the identified phase shift amount.

When the electric power is supplied from the power supply (10) to the inverter (202) using the two-phase modulation method, the control method can reduce the amplitude of the harmonic wave generated by the switching of the inverter (202) without changing the size of the filter (201).

(9) According to a ninth aspect, there is provided the program causing the computer (5) that controls the inverter (202) for driving the load (203) to execute a process including generating the first signal for performing the two-phase modulation when the three-phase alternating current voltage is generated, acquiring the weight of the load (203), storing the corresponding relationship between the weight of the load (203) and the phase shift amount of the signal, identifying the phase shift amount corresponding to the acquired weight of the load (203) in the corresponding relationship, and generating the second signal in which the phase shift amount is changed from the first signal, based on the identified phase shift amount.

When the electric power is supplied from the power supply (10) to the inverter (202) using the two-phase modulation method, the program can reduce the amplitude of the harmonic wave generated by the switching of the inverter (202) without changing the size of the filter (201).

INDUSTRIAL APPLICABILITY

According to the control device, the inverter system, the control method, and the program in the present disclosure, it is possible to reduce the amplitude of the harmonic wave generated by switching of the inverter without changing a size of the filter when electric power is supplied from the power supply to the inverter using the two-phase modulation method.

REFERENCE SIGNS LIST

1: motor drive device
5: computer
6: CPU
7: main memory
8: storage
9: interface
10: power supply
20: first device
30: second device
40: control device
201: low-pass filter
202: inverter
203: load
2021, 2022, 2023, 2024, 2025, 2026: switching element
401: first generation unit
402: acquisition unit
403: storage unit
404: identification unit
405: second generation unit

The invention claimed is:
1. A control device that controls an inverter for driving a load, comprising:
a first generation unit that generates a first signal for performing two-phase modulation when a three-phase alternating current voltage for driving the load is generated;
an acquisition unit that acquires a weight of the load;

a storage unit that stores a corresponding relationship between the weight of the load and a phase shift amount of the first signal;
an identification unit that identifies the phase shift amount corresponding to the weight of the load acquired by the acquisition unit, in the corresponding relationship; and
a second generation unit that generates a second signal in which the phase shift amount is changed from the first signal, based on the phase shift amount identified by the identification unit.

2. The control device according to claim 1,
wherein the load is a motor, and
the weight of the load is a rotation speed of the motor.

3. The control device according to claim 2,
wherein the load is a motor, and
the corresponding relationship indicates that a rotation speed of a motor and the phase shift amount are proportional to each other.

4. The control device according to claim 2,
wherein the load is a motor, and
the corresponding relationship indicates that the phase shift amount is 90 degrees when a rotation speed is high within an entire range in the rotation speed of the motor.

5. The control device according to any claim 2,
wherein the load is a motor, and
the corresponding relationship indicates that the phase shift amount is 30 degrees when a rotation speed is low within an entire range in the rotation speed of the motor.

6. The control device according to claim 2,
wherein the phase shift amount is an amount converted by an electric angle.

7. An inverter system comprising:
a low-pass filter;
an inverter that converts direct current power into alternating current power;
a power supply that supplies the direct current power to the inverter via the low-pass filter; and
the control device that controls the inverter according to claim 2.

8. The control device according to claim 1,
wherein the load is a motor, and
the corresponding relationship indicates that a rotation speed of a motor and the phase shift amount are proportional to each other.

9. The control device according to claim 8,
wherein the load is a motor, and
the corresponding relationship indicates that the phase shift amount is 90 degrees when a rotation speed is high within an entire range in the rotation speed of the motor.

10. The control device according to any claim 8,
wherein the load is a motor, and
the corresponding relationship indicates that the phase shift amount is 30 degrees when a rotation speed is low within an entire range in the rotation speed of the motor.

11. The control device according to claim 8,
wherein the phase shift amount is an amount converted by an electric angle.

12. The control device according to claim 1,
wherein the load is a motor, and
the corresponding relationship indicates that the phase shift amount is 90 degrees when a rotation speed is high within an entire range in the rotation speed of the motor.

13. The control device according to any claim 12,
wherein the load is a motor, and
the corresponding relationship indicates that the phase shift amount is 30 degrees when a rotation speed is low within an entire range in the rotation speed of the motor.

14. The control device according to claim 12,
wherein the phase shift amount is an amount converted by an electric angle.

15. The control device according to any claim 1,
wherein the load is a motor, and
the corresponding relationship indicates that the phase shift amount is 30 degrees when a rotation speed is low within an entire range in the rotation speed of the motor.

16. The control device according to claim 15,
wherein the phase shift amount is an amount converted by an electric angle.

17. The control device according to claim 1,
wherein the phase shift amount is an amount converted by an electric angle.

18. An inverter system comprising:
a low-pass filter;
an inverter that converts direct current power into alternating current power;
a power supply that supplies the direct current power to the inverter via the low-pass filter; and
the control device that controls the inverter according to claim 1.

19. A control method performed by a control device that controls an inverter for driving a load, the control method comprising:
generating a first signal for performing two-phase modulation when a three-phase alternating current voltage for driving the load is generated;
acquiring a weight of the load;
storing a corresponding relationship between the weight of the load and a phase shift amount of the first signal;
identifying the phase shift amount corresponding to the acquired weight of the load in the corresponding relationship; and
generating a second signal in which the phase shift amount is changed from the first signal, based on the identified phase shift amount.

20. A program causing a computer to execute a process for controlling an inverter for driving a load, the process comprising:
generating a first signal for performing two-phase modulation when a three-phase alternating current voltage for driving the load is generated;
acquiring a weight of the load;
storing a corresponding relationship between the weight of the load and a phase shift amount of the first signal;
identifying the phase shift amount corresponding to the acquired weight of the load in the corresponding relationship; and
generating a second signal in which the phase shift amount is changed from the first signal, based on the identified phase shift amount.

* * * * *